D. D. HAYES.
Coupling for Connecting Fire Engines with
Hydrants, &c.
No. 232,495.                      Patented Sept. 21, 1880.
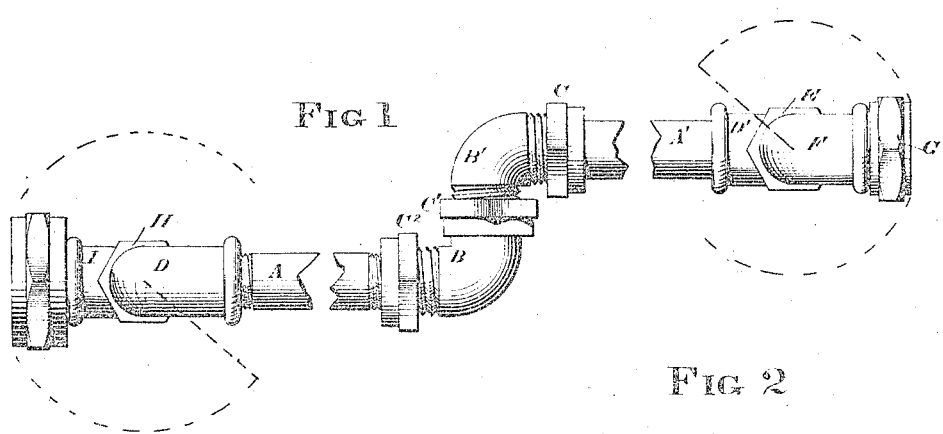
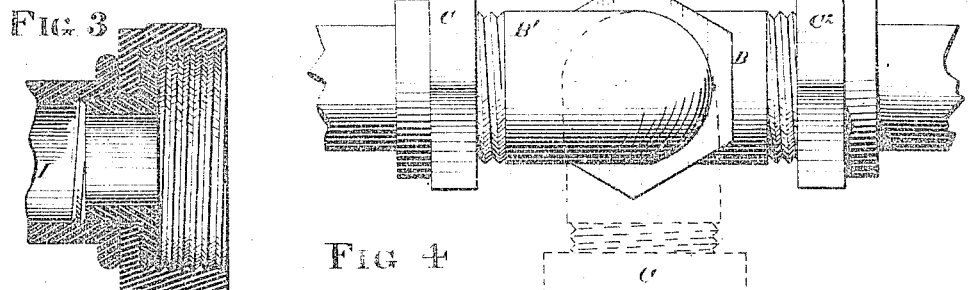
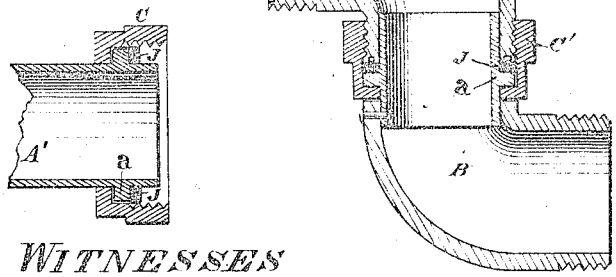
WITNESSES
Wilmer Bradford
J. Erastus Lester
INVENTOR.
Daniel D Hayes,
By C. W. M. Smith, atty

UNITED STATES PATENT OFFICE.

DANIEL D. HAYES, OF SAN FRANCISCO, CALIFORNIA.

COUPLING FOR CONNECTING FIRE-ENGINES WITH HYDRANTS, &c.

SPECIFICATION forming part of Letters Patent No. 232,495, dated September 21, 1880.

Application filed February 24, 1880.

*To all whom it may concern:*

Be it known that I, DANIEL D. HAYES, of San Francisco, in the county of San Francisco and State of California, have invented a new and useful Coupling for Connecting Fire-Engines to Hydrants or Water-Mains, of which the following is a specification.

My invention relates to an automatic or universal coupling for connecting fire-engines to hydrants or water-mains without the necessary delay so incident to the methods now employed for that purpose; and the objects of my improvements are, first, to provide a coupling having joints, so that the sections can be folded up or expanded or turned in any direction to correspond to the distance and location of the engine from the hydrant or main without the necessity of backing or moving the engine forward or back to arrive at the exact distance before the connection of the suction or service pipe which conducts the water from the hydrant to the engine can be made; second, to afford facilities for the proper adjustment of the coupling with reference to the distance vertically between the hydrant or fire-plug and engine.

I attain these objects by the mechanism illustrated in the accompanying drawings, in which—

Figure 1 is a side elevation of my coupling with portions broken away; Fig. 2, an enlarged view of center joint; Fig. 3, sectional view of coupling to engine; Fig. 4, vertical section of one coupling; Fig. 5, vertical section of one union to universal joint.

Similar letters refer to similar parts throughout the several views.

In connecting the two arms A and A' of my coupling to provide a combined horizontal rotary and vertical rotary movement, I construct the two curved shoulder nipples or elbows B and B'. The elbow B' is provided with a male screw at both ends, which engage in the female unions C and C' on the end of the pipe A' and elbow B. I cut a male screw on the outer end of the elbow B and connect it by a female union, C², to the inner end of the arm or pipe A.

All of the unions C C' C² turn against shoulders $a$, made on the ends of the arms or pipes A A', and on the end elbow B, so that in turning a horizontal rotary as well as a vertical rotary movement is had at all angles of the elbows and arms.

To the outer ends of the arms A and A' are rigidly connected the elbows D D'. The elbow represented at D' is provided with a female union, E, which turns easily upon a shoulder in the end of the said elbow, and in this female screw fits the coupling-elbow F, and at the outer end of this elbow is the female union G, by which the connection is made with the engine. This coupling also works against a shoulder on the end of the elbow F, so as to be easily rotated.

The union H, on the end of elbow D, or hydrant end of the coupling, is made rigid, and has a female screw, in which the male screw of the hydrant-elbow I works, so that a horizontal rotary movement is had by the hydrant-union and a vertical rotary movement by the inner end of the elbow I in the stationary union H.

All of these unions or joints are packed with leather J, as shown, so that no leakage will take place.

The operation will be as follows, to wit: The coupling, being always attached to the engine, may be folded up, and when the hydrant or main is approached by the engine the coupling is easily and instantly withdrawn or unfolded to a sufficient extent to connect it at once to the hydrant, whether it, the hydrant or plug, is on a plane with the suction opening or plug of the engine or not, or whether the engine comes to a standstill at the right or left of the hydrant or not, and thus the delay so incident to the excitement of connecting engines to hydrants is avoided and an immediate connection is had.

It should here be observed that the joints may be left loose for connection and be tightened up afterward. It should also be observed that my coupling may be used for all purposes for which suction-hose is employed.

Having thus described my invention, what I claim, and desire to secure by Letters Patent, is—

1. In combination with the arms A A', having shoulders $a$, and provided with the unions C C², the curved nipples or elbows B B', provided with union C', all constructed and arranged as and for the purpose specified.

2. In combination with the arms A A' and universal coupling B B', provided with the unions C C' C², the end elbows, D D' and F I, provided with unions E H, all constructed and arranged as and for the purpose described.

In testimony that I claim the foregoing I have hereunto set my hand and seal this 7th day of February, 1880.

DANIEL D. HAYES. [L. S.]

Witnesses:
C. W. M. SMITH,
HOLLAND SMITH.